United States Patent [19]

Lewis et al.

[11] Patent Number: 4,482,972

[45] Date of Patent: Nov. 13, 1984

[54] DISTANCE SENSING APPARATUS AND METHOD

[76] Inventors: Clarence A. Lewis; James E. Lewis; Richard D. Lewis, all of R.D. 3 Box 115, Blairstown, N.J. 07825

[21] Appl. No.: 277,224

[22] Filed: Jun. 25, 1981

[51] Int. Cl.³ .................... G01B 7/00; G01B 7/24
[52] U.S. Cl. .................... 364/561; 101/181; 226/87; 377/18
[58] Field of Search ............ 101/178, 179, 181, 219, 101/228, 232, 248; 226/27, 28, 29, 30, 31; 364/561, 523, 900 MS File; 377/18, 17

[56] References Cited

U.S. PATENT DOCUMENTS

| | | | |
|---|---|---|---|
| 3,276,647 | 10/1966 | Lewis et al. | 226/31 |
| 3,525,858 | 8/1970 | Thiede et al. | 226/28 X |
| 3,556,509 | 1/1971 | Crum | 226/28 X |
| 3,594,552 | 7/1971 | Adamson et al. | 377/18 |
| 3,601,587 | 8/1971 | Thiede | 101/181 |
| 3,806,812 | 4/1974 | Roch | 226/28 X |
| 4,129,238 | 12/1978 | Herd | 226/29 |
| 4,129,862 | 12/1978 | Kaplan et al. | 377/17 X |
| 4,135,664 | 1/1979 | Resh | 226/3 X |
| 4,181,847 | 1/1980 | Buschmann et al. | 226/30 X |
| 4,264,957 | 4/1981 | Pautzke | 226/28 X |
| 4,277,674 | 7/1981 | Sato et al. | 377/18 |
| 4,318,176 | 3/1982 | Stratton et al. | 101/248 X |
| 4,366,753 | 1/1983 | Glanz et al. | 101/81 |

Primary Examiner—James D. Thomas
Assistant Examiner—David L. Clark
Attorney, Agent, or Firm—Behr & Adams

[57] ABSTRACT

Apparatus for sensing distance between a pair of indicia on a surface moving relative to the apparatus has an interval detector, a sensor and a scale device. The interval detector can respond to movement of the surface. The detector can produce an interval signal signifying the time elapsing during the passage of an interval on the surface of a predetermined length. The sensor is positioned alongside the surface for sensing the arrival times of the pair of indicia at the sensor. The scale device responds to the interval detector and sensor device for producing a distance signal signifying the ratio of the time difference in arrival of the pair to the interval signal.

19 Claims, 5 Drawing Figures

DISTANCE SENSING APPARATUS AND METHOD

BACKGROUND OF THE INVENTION

The present invention relates to spatial measurements of indicia on a moving surface and, in particular, to utilization of such measurements in arts such as the printing arts.

Known printing systems employ a number of printing cylinders that successively print on a moving web differently colored patterns. An important consideration with such printing techniques is accurate registration of the patterns, which may be printed at a considerable distance from each other. It is known to print cross hairs at each printing cylinder to allow an operator to register visually the several patterns by manually adjusting the web path until all of the cross hairs register. Such manual adjustment is unsuitable for high speed printing operations where variations may occur too quickly to allow precise registration.

It is also known to automatically control registration of successively printed patterns on a web by employing photoelectric sensors that detect passage of a predetermined mark on the web. By employing a pair of such photoelectric sensors and a timing clock, the difference in time between arrival of the indicia can be used as an error signal. A disadvantage with measuring the time difference between two marks is that the resulting error signal is a function of web speed. Accordingly, any feedback loop employing this error signal will have its gain affected by the speed of the web, thereby fostering either a slow response or over-shoot. Another disadvantage with this known arrangement is the necessity of printing the indicia on separate tracks and in longitudinal alignment (alternatively, the photoelectric sensors must be positioned to account for any intentional misalignment). This restriction may be a serious disadvantage where a pattern ought to be printed right up to the edge of the web. In this case, there is either no room for the indicia or additional web material must be used and then stripped away as wastage merely for the purpose of registration.

Measuring the displacement between indicia with a conventional shaft encoder driven by a printing cylinder has serious disadvantages. Known shaft encoders do not economically provide sufficient resolution to permit the precise registration required in the printing trades. Using a tachometer device as a transducer for a printing cylinder to derive displacement also has serious disadvantages. Such a tachometer device could convert a speed signal into a distance increment by a voltage controlled oscillator. However, a controlled oscillator, operating typically by ramping until it reaches a controlled threshold value, has an unacceptable linearity since its retrace time is finite and non-linearly affects the frequency of operation.

Accordingly, there is a need for an accurate system for measuring displacement of indicia on a moving surface that overcomes the limitations of conventional transducers.

SUMMARY OF THE INVENTION

In accordance with the illustrative embodiments demonstrating features and advantages of the present invention, there is provided apparatus for sensing the distance between a pair of indicia on a surface moving relative to the apparatus. The apparatus includes an interval means, a sensor means and a scale means. The interval means responds to movement of the surface and can produce an interval signal signifying the time elapsing during the passage of an interval on the surface of a predetermined length. The sensor means is positioned alongside the surface for sensing the arrival times of the pair of indicia at the sensor means. The scale means responds to the interval and sensor means for producing a distance signal signifying the ratio of the time difference in arrival of the pair to the interval signal.

Also, in accordance with the principles of the present invention, there is provided a method for measuring the distance between a pair of indicia on a moving surface. The method includes the step of timing the passage of an interval on the surface of a predetermined length. Another step is timing the arrival of the pair of indicia. Another step of the method is calculating the ratio of the time difference in arrival of the indicia to the time elapsed for the passage of the interval.

By employing such apparatus and methods, a relatively simple and accurate technique for measuring indicia spacing on a moving surface is provided. In a disclosed embodiment, the apparatus is used to measure accurately the spacing between indicia separately printed by a respective one of a plurality of printing cylinders.

The apparatus and method of the present invention utilizes the well known equation $v=d/t$ for a moving object, where "d" is the distance traveled by an object moving at a velocity "v" in a time "t". It follows that for constant velocity the ratio of an unknown distance on a moving surface to a known distance thereon is directly equivalent to the ratio of the times for passage the unknown and known distances to pass a given point, respectively. If the time ratio is multiplied by the known or reference distance, for example, the product is the unknown distance.

The apparatus and method employ a ratiometric measurement. Although time and not distance between certain events is measured initially, these times are analyzed as a ratio to obtain distance. Preferably, a transducer such as an apertured disk is driven by an upstream printing cylinder to indicate the passage of a predetermined length of web. The passage of the known dimension provides a time reference, forming the denominator of the ratio. The numerator is the time elapsing between the arrival of the two indicia. Essentially, this ratio represents the indicia spacing at a fraction (or a percentage) of a known or predetermined web length.

In a preferred embodiment, this percentage measurement is multiplied by a scaling factor established by a manually operable scaling switch, so that the percentage measurements are converted into actual distance measurements. It is useful if the dimensions of an error signal produced from the above distance measurement remain the same even though the size of the printing cylinder may change. By keeping the scaling constant, the speed and magnitude of the system response is kept consistent.

In a preferred embodiment, an upstream printing cylinder drives an apertured disk having 128 apertures. By sensing the apertures, the repeat length or known distance on the web is finely divided into many increments. Phototransistors sense the apertures and drive a counter to produce a running tally of the incrementation of the printing cylinder throughout each revolution. This count can be used as a precursor of the arrival of an indicium at an optical scanner. This feature is significant since the relevant indicium may be buried within a cluttered printed pattern. However, upon reaching a predetermined count, the counter can operate equipment to render the optical scanner sensitive to the next occurring mark on the web. Thus, the indicium may be localized and distinguished from other confusingly similar marks on the moving web. This counter can also be used to define the reference interval over which a reference time measurement is made signifying the time for a known length of web to pass a given point. This feature is useful since the reference distance can then be simply established by multiplying the velocity of the web time this reference time interval, for example.

BRIEF DESCRIPTION OF THE DRAWINGS

The above brief description as well as other objects features and advantages of the present invention will be more fully appreciated by reference to the following detailed description of the presently preferred by nonetheless illustrative embodiments in accordance with the present invention when taken in conjunction with the accompanying drawings wherein.

DETAILED DESCRIPTION OF THE PREFERRED EMBODIMENT

Figure 1:
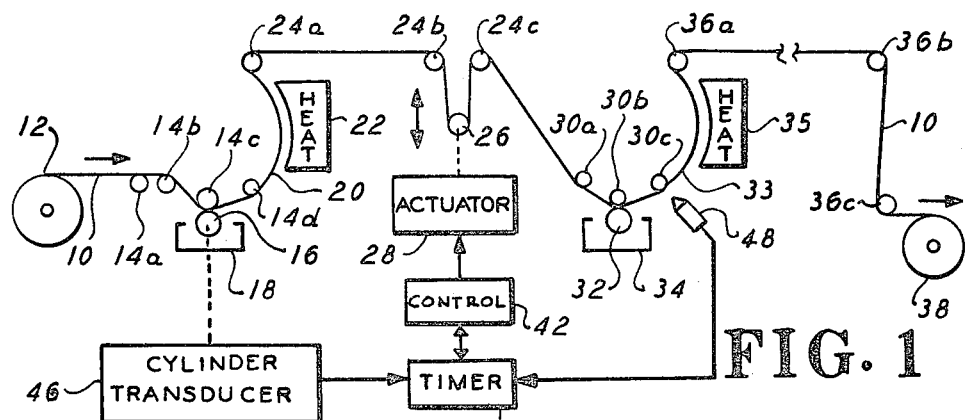
FIG. 1 is a schematic diagram of a printing system employing apparatus according to the principles of the present invention.

Referring to FIG. 1, apparatus according to the present invention is shown in a printing system operating as a means for sensing spacing between indicia on the printed surface of web 10. Web 10 is supplied from a feed roll 12 over rollers 14a, 14b, 14c, and 14d. A printing means, shown as a rotatable upstream printing cylinder 16, presses web 10 against roller 14c. Printing cylinder 16 is inked by an ink reservoir 18 and can print among other things indicia such as indicium 20 at the illustrated position. Thereafter, web 10 is fed past heater 22 to dry the recently deposited ink. Thereafter, web 10 is fed over rollers 24a, 24b and 24c, passing a vertically reciprocatable roller 26. Roller 26 can be vertically adjusted by an actuation means 28 to effectively change the path length of web 10.

Web 10 is then fed over rollers 30a, 30b and 30c past another printing means, shown herein as rotatable downstream printing cylinder 32 which prints a repeating pattern on web 10 from ink of a different color supplied from reservoir 34. Printing cylinder 32 prints another indicium on web 10, one being shown as indicium 33. Obviously, the pattern printed by cylinder 32 must be in registration with that from printing cylinder 16. Registration can be obtained by varying the path length of web 10 between cylinder 16 and 32 by adjusting roller 26 with actuator 28. The adjustment of registration through actuator 28 is regulated by a scale means, shown herein as a control means 42 driven by a timer 44. Control 42 preferably contains a well-known microcomputer to respond to data provided from timer 44 and to transmit control signals to actuator 28 and timer 44 in a manner subsequently described. After passing by heater 35 to dry the recently printed inks, web 10 is then fed over rollers 36a, 36b and 36c to take-up roll 38.

Rotation of upstream printing cylinder 16 is mechanically sensed by an interval means, shown herein as cylinder transducer 46 which provides a signal to timer 44. Also, passage of indicia such as indicia 20 and 33, are sensed by a sensor means shown herein as optical scanner 48 which also provides an input to timer 44.

Figure 2:
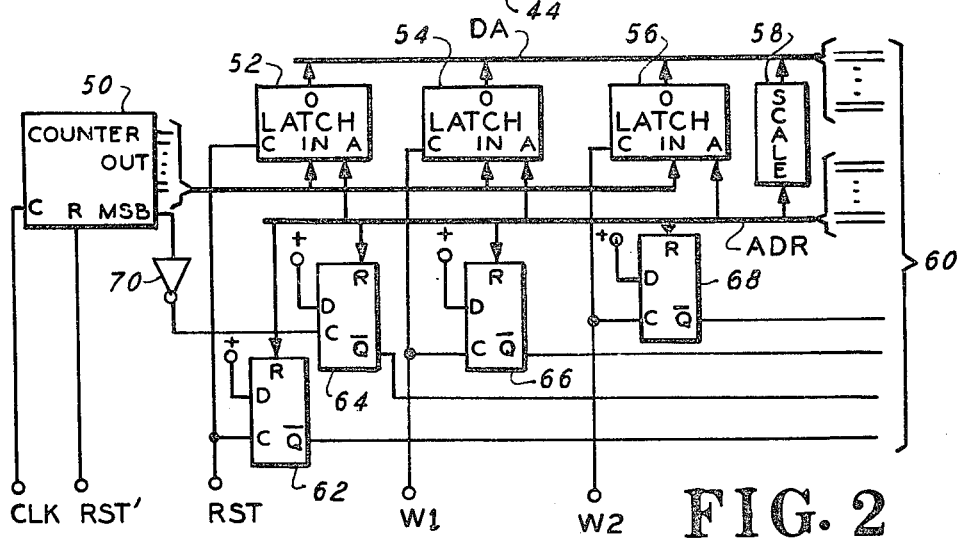
FIG. 2 is a schematic diagram of the timer of FIG. 1.

Referring to FIG. 2, a more detailed schematic diagram is given of the timer (timer 44 of FIG. 1). A counting means is shown herein as counter 50 connected to count clock pulses on its input C from terminal CLK. Terminal CLK acts as a clock means for providing timing pulses. The accumulated count is readable on output terminals OUT, any overflow being indicated by a signal on output terminal MSB. Counter 50 can be reset by applying a signal to its reset input R from terminal RST'. Connected to terminals OUT is a storage means, shown herein as latches 52, 54 and 56. Each of the terminals OUT of counter 50 are commonly connected to one corresponding terminal from each of the latch inputs IN of latches 52, 54 and 56. Latches 52, 54 and 56 store the count appearing on terminals OUT of counter 50 in response to a triggering pulse on the input C of each latch. The inputs C of latches 52, 54 and 56 are connected to terminals RST, W1 and W2, respectively. Data thus stored in these latches can be transmitted on their terminals O to data line DA when an appropriate address signal is received at their terminal A from address lines ADR. A manually adjustable means, shown herein as scaling switches 58, employs a plurality of bit switches, one for each relevant bit. Scale switches 58 are typically set to a number corresponding to the circumference of the printing cylinder being used for purposes described hereinafter. Scale switches 58 can transmit this manually set number onto data lines DA in response to appropriate address signals received from lines ADR. Data lines DA and address lines ADR are shown as part of a cable group 60 which leads to the control (control 42 of FIG. 1). Four D-type flip-flops 62, 64, 66 and 68 are shown with their D inputs tied to positive potential and their reset inputs connected to address lines ADR so the flip-flops can be reset after their data has been read. The C input of flip-flop 64 is connected to the output of inverter 70, whose input connects to output MSB of counter 50. The C inputs of flip-flops 62,66 and 68 connect to terminals RST, W1 and W2, respectively. The Q̄ outputs of flip-flops 62–68 are shown combined into cable group 60 to be connected to the control (control device 42 of FIG. 1).

Figure 3:
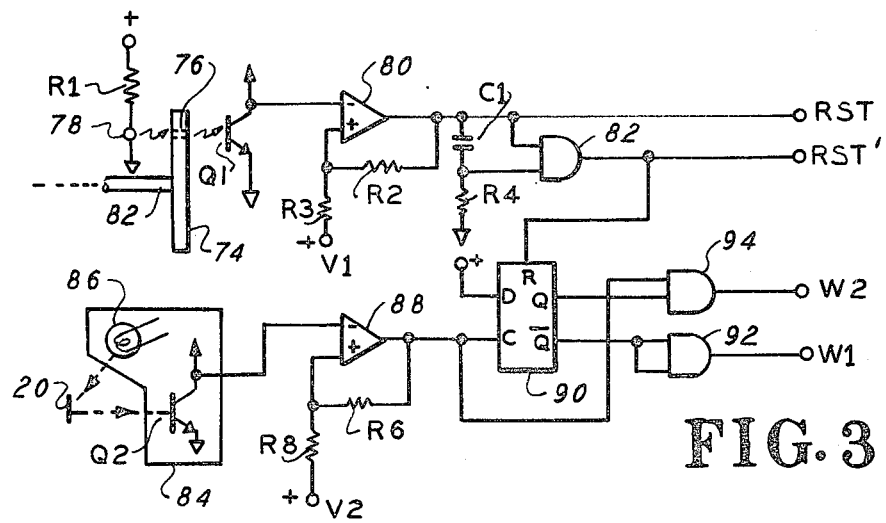
FIG. 3 is a schematic diagram of the transducers of FIG. 1.

Referring to FIG. 3, further details of the sensors (transducers 46 and 48 of FIG. 1) are given. An incremental means is shown herein as disk 74 having an indexed periphery, namely, single aperture 76. Aperture 76 can be aligned with infrared emitter 78, supplied with current through limiting resistor R1. Light from emitter 78 is shown passing through aperture 76 to activate a transducer, phototransistor Q1. A shaft 82 supporting disk 74 is mechanically coupled to the upstream printing cylinder (printing cylinder 16 of FIG. 1). Thus, phototransistor Q1 can produce a pulse each time the upstream printing cylinder completes one revolution.

The emitter of transistor Q1 is grounded and its collector connects to the inverting terminal of operational amplifier 80, whose output and noninverting terminals separately connect to the terminals of feedback resistor R2. Thus connected, resistor R2 provides the well-known hysteresis effect. Resistor R3 connects between a positive reference voltage V1 and the noninverting terminal of amplifier 80. One terminal of capacitor C1 is connected to the output of amplifier 80, its other terminal being connected to one terminal of resistor R4, whose other terminal is grounded. Connected to the junction of resistor R4 and capacitor C1 is one input of AND gate 82, whose other input is connected to previously mentioned terminal RST and the output of amplifier 80. Being connected in this fashion, AND gate 82 has one of its inputs driven by a high pass filter (resistor R4 and capacitor C1) and can produce a high signal only for a short period of time until capacitor C1 becomes charged. This feature is useful where the printing system is operating very slowly and unnecessarily long pulses are not wanted.

A sensor means is shown herein as assembly 84, housing lamp 86 and phototransistor Q2. Transistor Q2 and lamp 86 are arranged so that light from the latter reflecting off indicium 20 can activate phototransistor Q2. The emitter of phototransistor Q2 is grounded and its collector is connected to the inverting terminal of operational amplifier 88, whose output and noninverting input terminals separately connect to the terminals of resistor R6. Thus connected, resistor R6 can provide the well-known hysteresis effect. Biasing potential V2 is connected to one terminal of resistor R8, whose other terminal connects to the noninverting terminal of amplifier 88. The output of amplifier 88 connects to input C of D-type flip flop 90, whose reset input R connects to terminal RST' and the output of AND gate 82. Positive potential is connected to input D of flip flop 90 and its Q̄ terminal is connected to both inputs of AND gate 92, whose output is identified as terminal W1. Previously mentioned terminal W2 is the output of AND gate 94, whose two inputs separately connect to output Q and input C of flip flop 90.

In operation, the apparatus of FIG. 3 will produce a high signal on terminal RST whenever disk 74 rotates its aperture 76 into alignment with phototransistor Q1, that is, once each revolution of the printing cylinder (printing cylinder 16 of FIG. 1). A pulse of a predetermined duration will be produced on terminal RST' whenever aperture 76 becomes aligned with transistor Q1, causing flip flop 90 to be reset. Amplifier 88 produces a pulse each time an indicium such as indicium 20 passes by phototransistor Q2. Since flip flop 90 has just been reset as noted, the first occurring pulse at the output of amplifier 88 triggers flip flop 90 to produce a falling signal at its output Q̄ which is relayed through AND gate 92 and applied to terminal W1. This triggering also produces from output Q of flip flop 90 a high signal with no further effect. Subsequently, the second occurring pulse from the output of amplifier 88 is applied to one input of AND gate 94 to replicate that pulse on terminal W2, since output Q of flip-flop 90 is as previously noted now high. Therefore, flip-flop 90 has operated as a steering circuit to allow the first pulse to produce a negative transition on terminal W1 while the second pulse produces a pulse on terminal W2.

To facilitate an understanding of the principles associated with the apparatus of FIGS. 1–3, its overall operation will now be briefly described. Initially, web 10 is set-up as illustrated in FIG. 1 and web 10 advanced slowly, allowing an operator to manually adjust roller 26 and bring the patterns on web 10 into registration. This could be done by visual observation of the resulting pattern or by simply employing cross hairs that the operator visually aligns. Once this initial registration has been obtained, the operator places the microcomputer in control 42 into an automatic mode of operation. Control 42 now measures, in a manner to be described presently, the displacement between indicia produced by cylinders 16 and 32 and stores that displacement in computer memory as the ideal dimension for accurate registration, as follows:

As cylinder 16 initially rotates, disk 74 (FIG. 3) for the first time aligns its aperture 76 with phototransistor Q1 to produce a pulse on terminals RST and RST'. The pulse on terminal RST' drives reset input R of counter 50 (FIG. 2) to a zero count. Thereafter, high frequency clock pulses applied to input C of counter 50 increment the count on its terminals OUT. While this count is increasing, eventually a first indicium arrives at scanner 84 (FIG. 3) causing AND gate 92 to produce, for the reasons previously given, a pulse on terminal W1. The pulse of terminal W1 triggers latch 54, causing it to store the current count of counter 50. Accordingly, latch 54 stores a number corresponding to the time elapsing between the resetting of counter 50 (caused by disk 74) and the arrival of the first indicium. Also at this time, the pulse on terminal W1 triggers flip-flop 66 to produce a low signal on its terminal Q̄ signaling control 42 (FIG. 1) of the existence of new data through cable 60. Subsequently, a second indicium arrives at scanner 84 (FIG. 3) to produce a second pulse on terminal W2 for the reasons previously given. This second pulse on terminal W2 causes latch 56 (FIG. 2) to store the current count of counter 50. Thus, latch 56 stores a number corresponding to the time elapsing from the resetting of counter 50 (caused by disk 74) to the arrival of the second indicium. Also at this time, the pulse on terminal W2 triggers flip flop 68 so it produces a low signal on its terminal Q̄, again signaling control 42 of the existence of new data through cable 60.

Eventually, cylinder 16 (FIG. 1) completes a revolution and another pulse pair is produced on terminals RST and RST' (FIGS. 2 and 3). The pulse on terminal RST causes latch 52 to store the current count of counter 50. Therefore, latch 52 stores a number corresponding to the time elapsing between successive resettings of counter 50. Since this elapsed time corresponds to that required to move web 10 (FIG. 1) one repeat length (the circumference of printing cylinder 16) latch 52 (FIG. 2) stores a reference time corresponding to the time necessary for a predetermined length of web to pass. Also at this time, the pulse of terminal RST triggers flip-flop 62 so that it now produces a low output on its terminal Q̄, signaling control 42 through cable 60 of the existence of new data. Should counter 50 exceed its count range and overflow, an overflow signal through inverter 70 drives output Q̄ of flip-flop 64 low, signaling control 42 (FIG. 1) through cable 60 of this condition.

The above description indicates that latches 54, 56 and 52 (FIG. 2) are successively updated on the count of counter 50 at the following three events: the arrival of the first indicium, the arrival of the second indicium and the end of a repeat interval as sensed by disk 74 (FIG. 1), respectively. At each of these events, a corresponding flip-flop 66, 68 and 62 provide to the microcomputer of control 42 interrupting signals, indicating that updated data is available. In response, appropriate address signals are provided on line ADR to cause the updated latches 52, 54 and 56 to successively transmit onto data lines DA the updated count information.

Thereafter, control 42 (FIG. 1) transmits on address line ADR (FIG. 2) signals which reset the flip flops 62, 66 and 68. Flip flop 64 operates in a similar manner to provide an interrupt signal to control 42 to signal that counter 50 has exceeded its count capacity. Again, resetting signals on address line ADR reset flip flop 64.

The information thus collected by control 42 is analyzed to determine the spacing between successive indicia. Basically, the microcomputer of control 42 subtracts the number received from latch 54 from that received from latch 56 and divides this difference by the number received from latch 52. Expressed in mathematical terms this process can be defined as follows:

$$D = \frac{W2 - W1}{GR}$$

Wherein D is the spacing between indicia in arbitrary units, W1 is the count of latch 54, W2 is the count of latch 56 and GR is the count of latch 52. It will be observed that this expression essentially defines the fraction of the repeat length of cylinder 16 (FIG. 1) spanned by the pair of indicia contained within that interval. This fractional length, of course, can be rescaled to represent centimeters, inches or some arbitrary units. To this end, scale switch 58 (FIG. 2) is set at a number corresponding to the circumference (alternatively, the diameter) of printing cylinder 16. This then establishes the physical length of the repeat interval of cylinder 16 which then defines the scaling of the above equation. Essentially, if the above equation is multiplied by the repeat length set by scale switch 58, it produces the actual distance between indicia.

The foregoing described the first cycle of operation. This cycle repeats each time printing cylinder 16 revolves. It was initially assumed that the registration and thus the spacing between indicia was accurately adjusted manually. Therefore, the spacing just measured ought to be mantained so that accurate registration persists. Accordingly, the microcomputer of control 42 automatically stores this reference spacing. The microcomputer 42 separately stores the above mentioned quanities: W1, W2 and GR, which are then identified as initial quantities W1I, W2I and GRI, respectively.

Thereafter, if the registration drifts due to slippage or other factors, the control 42 (FIG. 1) produces an error signal as follows: Assume that many cycles have been repeated and that the last occurring cycle produced a new set of counts referred to herein as W1N, W2N and GRN from latches 54, 56 and 52, respectively (FIG. 2). The ratio D according to the above equation can be recalculated and compared to the initially calculated ratio. The difference between the initial and the new ratio would constitute an error signal. This error signal would be in arbitrary units unless it was rescaled by scaling switches 58 in the manner previously described. Alternatively, the old and current data may be reprocessed according to the following equation:

$$E = C\left[\frac{W2N - W1N}{GRN} - \frac{W2I - W1I}{GRI}\right]$$

Wherein E is the actual error in registration in units determined by the setting C of switches 58.

It will be noted that the frequency of the clock driving counter 50 (FIG. 2) does not influence any of the foregoing equations. Thus, the accuracy and any slow drift of the clock is relatively insignificant. It is also significant that the error E calculated by control 42 is scaled to a definite unit of measure. As a result, the scaling of the output from control 42 (FIG. 1) can be adjusted so that the drive applied to actuator 28 will be in proportion to the error. Since the error signal is part of a feedback loop controlling the positioning of roller 26, the size of the error signal and the amount of feedback is not arbitrary and does not vary with the size of cylinder 16. Therefore, the control 42 drives actuator 28 to reduce the error toward zero, accurately and without overshoot, causing precise registration between the patterns of cylinders 16 and 32.

Figures 4, 5:
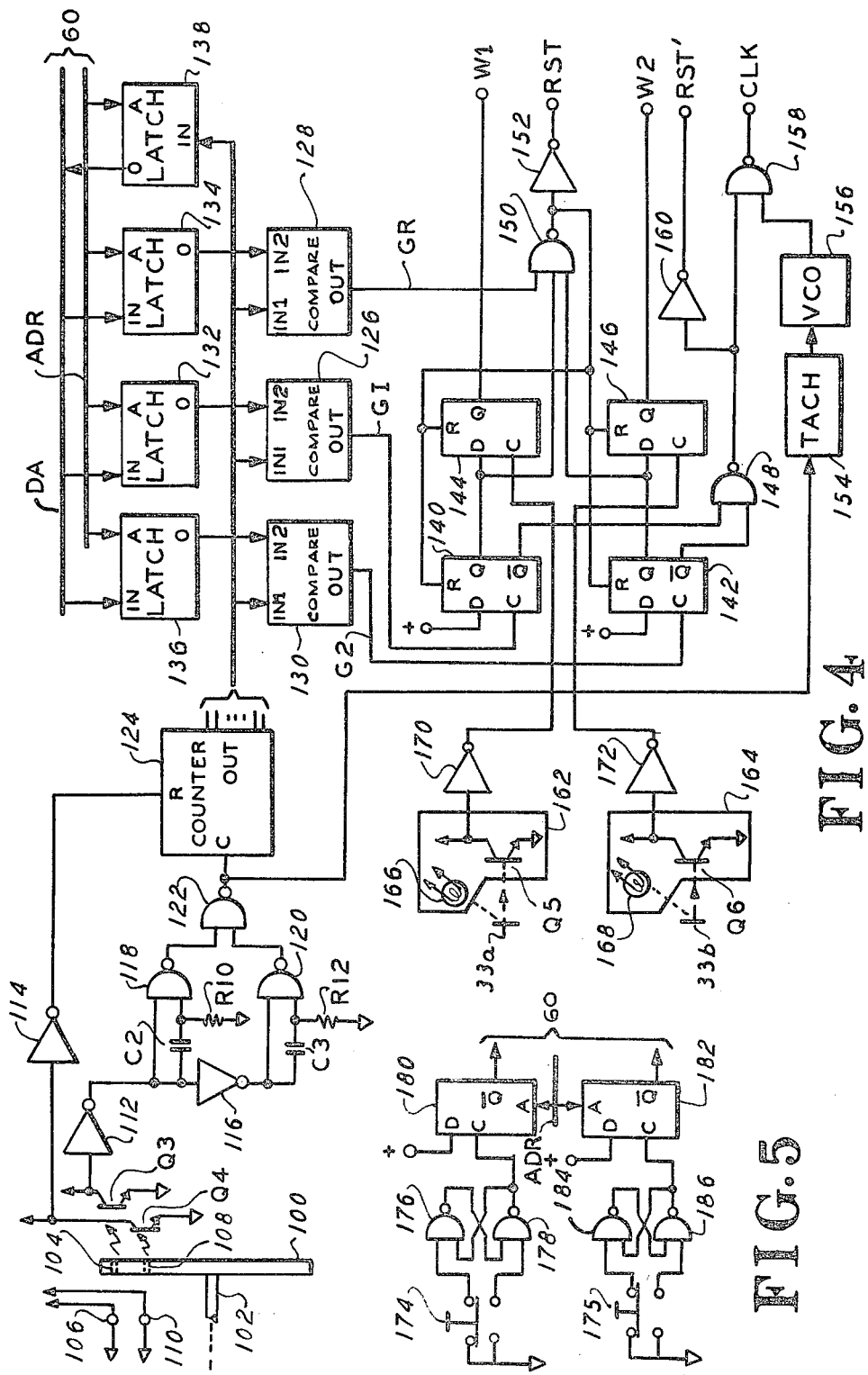
FIG. 4 is a schematic diagram of a tranducer system which is an alternate of that of FIG. 3.
FIG. 5 is a schematic diagram of a manual signaling device that may be employed with the apparatus of FIG. 1.

Referring to FIG. 4, a transducer system which is an alternate of that of FIG. 3 is illustrated. Alternate disk 100 is also driven by shaft 102 coupled to upstream printing cylinder 16 (FIG. 1). Disk 100 has an indexed periphery comprising 128 equally spaced apertures, one such aperture being shown herein as aperture 104. Aperture 104 can be rotated into alignment with infrared emitter 106 and a transducer, shown herein as phototransistor Q3. Disk 100 has at a different radial location a resetting aperture 108 which can be rotated into alignment with infrared emitter 110 and another transducer, shown herein as phototransistor Q4. Phototransistors Q3 and Q4 have grounded emitters and collectors separately connected to the inputs of inverting amplifiers 112 and 114, respectively. The output of amplifier 112 is connected to the input of inverter 116 and one terminal of capacitor C2, whose other terminal is connected to grounding resistor R10. The inputs of NAND gate 118 are separately connected across capacitor C2. The output of inverter 116 is connected to one terminal of capacitor C3, its other terminal being connected to one terminal of grounding resistor R12. The inputs of NAND gate 120 are separately connected across capacitor C3. The inputs of NAND gate 122 are separately connected to the outputs of NAND gates 118 and 120. The output of NAND gate 122 is connected to the counting input C of counter 124, whose resetting input R is connected to the output of amplifier 114.

NAND gates 118-122 can operate as a doubling means for doubling the number of pulses provided by amplifier 112 as follows: The high pass filter comprising capacitor C2 and resistor R10 connected to NAND gate 118 allows it to produce a pulse of a limited duration. Thus NAND gate 118 will only respond for a limited time to a high signal from amplifier 112. Since NAND gate 120 has a similar high pass filter in its input, and since it is driven through inverter 116, the latter circuit responds to produce a limited duration pulse in response to a low signal from amplifier 112. As a result, NAND gate 118 and 120 alternately produce limited duration pulses in synchronism with the leading and trailing edges of pulses from amplifier 112. These pulses are combined in NAND gate 122 to produce a doubled pulse input to counter 124.

The count reached by counter 124 is indicated on its output terminals OUT which are separately connected in parallel to comparison means, shown herein as first comparator 126, second comparator 130 and third comparator 128. These comparators are digital comparators which each produce a signal on its terminal OUT when the data on its input IN1 exceeds that on input IN2. The inputs IN2 of comparators 126, 128 and 130 are separately connected to the outputs O of latches 132, 134 and 136, respectively. A fourth latch, 138 is also connected by its input IN into output terminals OUT of counter 124. Previously described data line DA are bus lines which are connected in parallel to inputs IN of latches 132, 134 and 136, while their address inputs A connect to previously described address bus lines ADR. The output O and address input A of latch 138 connects to data bus lines DA and address lines ADR, respectively. Latches 132–136 are constructed and connected so that data transmitted on lines DA contemporaneously with corresponding address signals on lines ADR can cause each latch to replicate the transmitted data onto its output O. Latch 138 is configured so that the count on terminal OUT of counter 124 can be latched and transmitted on the output O of latch 138 when a corresponding address signal is applied to its address input A. Lines DA and ADR are part of previously described cable 60 which connects to microcomputer 42 (FIG. 1).

A logic means is shown herein as D-type flip-flops 140, 142, 144 and 146. The D inputs of flip-flops 140 and 142 are connected to a source of positive potential and its C inputs are connected to outputs OUT of comparators 126 and 130 by lines G1 and G2, respectively. The outputs $\bar{Q}$ of flip-flops 140 and 142 separately connect to the inputs of NAND gate 148. The Q outputs of flip-flops 140 and 142 separately connect to the D inputs of flip-flops 144 and 146, respectively. The Q outputs of flip-flops 144 and 146 are identified as terminals W1 and W2, respectively, which correspond to the previously mentioned terminals of FIG. 2. NAND gate 150 has one of its inputs connected to line GR (terminal OUT of comparator 128) and its two other inputs separately connected to the Q outputs of flip-flops 140 and 142. The output of NAND gate 150 connects to the reset inputs R of flip-flops 140–146 and to the input of inverter 152, whose output corresponds to terminal RST previously described in FIG. 2.

The output of NAND gate 122 bearing the doubled clock pulses, drives a speed sensor 154 which produces an output having a magnitude that is a function of the frequency of pulses at its input. This output is applied to a clock means shown as voltage controlled oscillator 156 which produces a clock signal at a frequency approximately proportional to the output of speed sensor 154. The output of oscillator 156 is connected to one input of NAND gate 158, whose other input connects to the output of NAND gate 148 and the input of inverter 160. The outputs of inverter 160 and NAND gate 158 correspond to terminals RST' and CLK, respectively, previously described in FIG. 2.

A sensor means is shown in this embodiment as a pair of phototransistors Q5 and Q6 mounted within scanner assemblies 162 and 164, respectively. Also mounted in assemblies 162 and 164 are lamp units 166 and 168, respectively. The lamps are shown reflecting light off indicia 33a and 33b to stimulate transistors Q5 and Q6, respectively. The emitters of transistors Q5 and Q6 are grounded and their collectors are connected to the inputs of inverting amplifiers 170 and 172, respectively. The outputs of inverting amplifier 170 and 172 are separately connected to triggering inputs C of flip flops 144 and 146, respectively.

Referring to FIG. 5, a pair of push-button switches 174 and 175 are the single-pole double-throw type, all of their two left (input side) terminals being connected together to ground. The normally connected one of the right (output side) terminals of switch 174 is connected to one input of NAND gate 176. The other, normally unconnected, right(output side) terminal of switch, 74 is connected to one input of NAND gate 178. NAND gates 176 and 178 are connected in a bistable configuration such that each has an output connected to a separate, remaining input of the other. The output of NAND gate 178 is connected to trigger input C of flip flop 180. D-type flip-flop 180 and 182 each have their D inputs connected to a positive potential, their $\bar{Q}$ outputs separately routed into cable 60 and their address inputs A bussed together onto address lines ADR of cable 60. Cable 60, as previously mention, is routed to control 42 (FIG. 1). The normally connected one of the right (output side) terminals of switch 175 is separately connected to one input of NAND gate 184 and the other, normally unconnected, right(output side) terminal of switch 175 is separately connected to one input of NAND gate 186. NAND gates 184 and 186 are connected in a bistable configuration so that each has an output connected to a separate, remaining input of the other. The output of NAND gate 186 connects to trigger input C of flip-flop 182.

To facilitate an understanding of the principles associated with the apparatus of FIGS. 4 and 5, its operation will be briefly described. It will be appreciated that the apparatus of FIG. 2 responds to signals produced from the equipment of FIG. 4 in the same manner as was previously described in connection with the apparatus of FIG. 3. Accordingly, the apparatus of FIGS. 4 and 5 will only be described to the extent necessary to define its operation and the overall system operation will not be described again.

It will be appreciated that the scanner (scanner 48 of FIG. 1) is comprised of two transducers: assemblies 162 and 164. Scanners 162 and 164 may be longitudinally or laterally spaced from each other depending upon relative position of the indicia to be detected by each.

The purpose of the equipment of FIG. 4 is to produce a precursor of the arrival of an indicium. This prior information is developed by slowly advancing web 10 (FIG. 1) so that disk 100 (FIG. 4) through phototransistor Q3, gradually increases the count in counter 124 (phasing held by resetting with aperture 108) and awaiting the arrival of indicia 33a and 33b. As the web is slowly advanced, the first indicium 33a arrives at a location slightly upstream of scanner 162. Observing this imminent arrival, an operator depresses push-button switch 174 (FIG. 5) setting the bistable arrangement of NAND gates 176 and 178 so that NAND gate 178 triggers flip-flop 180, producing a low output from its output $\bar{Q}$. This signal is sensed by control 42 (FIG. 1) as an interrupting signal, signaling the imminent arrival of the first indicium. Consequently, control 42 addresses latch 138 (FIG. 4) and reads the current count of counter 124 over data lines DA. This current count is then retransmitted along lines data lines DA and stored in latch 132 which then produces on its output O a digital signal corresponding to the position of disk 100 immediately prior to the arrival of first indicium 33a at scanner 162.

Next, the operator continues to advance the web until second indicium 33b is slightly upstream of scanner 164. The operator then depresses switch 175, setting the bistable combination of NAND gates 184 and 186 and thereby causing flip-flop 182 to transmit an interrupt signal from its output $\bar{Q}$ through cable 60 to control 42 (FIG. 1). In response, the microcomputer of control 42 again reads latch 138 to obtain the current count of counter 124 and stores that count in latch 136. Thereafter, latch 136 applies to input IN2 of comparator 130 the digital signal corresponding to the position of disk 130 immediately prior to the arrival of second indicium 33b at scanner 164. Control 42 (FIG. 1) also stores in latch 134 (FIG. 4) a number exceeding that of latch 132 by a preprogrammed amount. As explained hereinafter, this preprogrammed number establishes the reference interval which acts as a predetermined length for establishing a time base for the other measurements. The foregoing established in an initial cycle two precursors for indicia 33a and 33b as well as a reference interval whose utility will be described in connection with a second cycle.

The web and thus disk 100 continues moving and as aperture 108 becomes aligned with transistor Q4 it resets counter 124 to ensure its phasing with disk 100. As the count of counter 124 accumulates, it eventually reaches a count exceeding that in latch 132. Consequently, comparator 126 produces a high signal thereby setting flip-flop 140. As a result, a high input is applied to input D of flip-flop 144, predicting the imminent arrival of an indicium. Also at this time, output $\bar{Q}$ of flip-flop 140 becomes low causing NAND gate 148 to apply a low signal through inverter 160 to terminal RST', causing the same response as was previously described in connection with the similarly identified terminal of FIG. 3. The high output from NAND gate 148 is also applied to gate 158 to allow clock pulses from oscillator 156 to be coupled through to terminal CLK, causing counter 50 of FIG. 2 to commence counting in a manner previously described.

When indicium 33a arrives at scanner 162, a pulse produced through inverter 170 triggers flip-flop 144 so that it produces on terminal W1 a positive going transition. This positive going transition is treated the same as were signals produced on the similarly identified terminals of FIG. 3.

As disk 100 continues to rotate and increment counter 124, it eventually exceeds the count of latch 136 so that a high output is applied along line G2 to input C of flip-flop 142. This sets flip-flop 142 thereby applying to input D of flip-flop 146 a high signal predicting the imminent arrival of an indicium. When the second indicium 33b arrives at scanner 164 a high signal is relayed from inverter 172 and applied to input C of flip flop 146, setting it and producing a high signal on terminal W2. The response of the system to this high signal on terminal W2 is the same as the previously described response to the signals on the similarly identified terminal of FIG. 3.

Eventually, the count of counter 124 exceeds that stored in latch 134 so that comparator 128 produces a high signal on line GR. Since all of the inputs to NAND gate 150 are now high, a low signal is coupled through to reset inputs R of flip-flop 140-146, resetting them. Also, a resetting signal is relayed through terminal RST to the similarly identified terminal of FIG. 2 to produce the results previously described. Upon the resetting of flip-flop 140 and 142 both of the inputs to NAND gate 148 become high, thereby applying a low input to one input of NAND gate 158 and stopping transmission of clock pulses to terminal CLK. Also, a pulse on line RST resets counter 50 of FIG. 2 with the consequences previously described.

While the oscillator 156 may run at any convenient frequency and, within limits, drift without causing errors, it is desirable to regulate its frequency through speed sensing circuit 154. The advantage of such an arrangement is that the oscillator frequency 156 may be reduced when the web is moving slowly and thereby avoid exceeding the capacity of counter 50 (FIG. 2).

Accordingly, the equipment just described in connection with FIGS. 4 and 5 defines a system for distinguishing specific indicia among a group of extraneous marks by measuring the advance of the web and dividing its motion into a number of ordered increments. A particular increment is then chosen as a precursor of the arrival of a specific indicium.

It is to be appreciated that various modifications may be implemented with respect to the above preferred embodiments. For example, alternate equipment for sensing a revolution of the printing cylinder or an increment thereof may be employed to provide a reference distance. Alternatively, a separate roller may be employed to directly sense motion of the web. Also, alternate optical or other mark sensing devices can be employed to detect predetermined indicia on the web. It is also anticipated that for practical embodiments, more than two printing cyliners will be employed so that more than one registration adjustment and therefore distance measuring apparatus will be required. While a microcomputer is shown handling the data generated by the above system, there is no reason why the data cannot be processed by analog circuitry in a conventional feedback loop. However, for those embodiments employing a microcomputer, it is expected that the program for gathering and processing data can be altered to vary the sequence in which various steps are performed and commands issued. It is also anticipated that numerous circuit modifications can be implemented depending upon the desired speed, accuracy, capacity, power handling requirements, etc.

Obviously, many modifications and variations of the present invention are possible in light of the above teachings. It is therefore to be understood that within the scope of the appended claims, the invention may be practiced otherwise than as specifically described.

What is claimed is:

1. Apparatus for sensing the distance between a pair of indicia on a surface being transported by a transporter relative to said apparatus, comprising:

interval means positioned alongside said transporter for providing in response to motivation of said surface successive interval signals, the time elapsing between two successive interval signals corresponding to a predetermined length of movement of said surface, said surface being transported by said transporter at a relatively constant velocity during passage of said predetermined length of movement;

sensor means positioned alongside said surface for providing, in response to the successive arrival times of said pair of indicia at said sensor means, first and second pulses; and timer means coupled to said interval means and sensor means to receive said inverval signals and said first and second pulses for producing first, second, and third discrete signals analogous to the time period GR required for passage of said predetermined length of movement of said surface, and the times of arrival W1 and W2 of said pair of indicia, respectively, said timer means including:

a clock means for periodically producing clock pulses; and counting means for counting pulses from said clock means for determining the time duration of values GR, and W2−W1, said apparatus further including:

ratio means for calculating the ratio D=(W2−W1)/GR from said first through third digital signals, where D represents the distance between said pair of indicia in arbitrary units.

2. Apparatus according to claim 1, wherein said clock means comprises:
a speed sensor for sensing the speed of said surface for producing a speed signal dimensioned to correspond to the travel speed of said surface; and
a voltage controlled oscillator responsive to said speed signal of said speed sensor for producing said clock pulses at a frequency approximately proportional to the size of said speed signal.

3. Apparatus according to claim 1 wherein said ratio means further includes:
storage means receptive of said interval signals, and said first and second pulses for storing the counts of said counting means between two successive interval signals for providing said first discrete signal, and for storing the count of said counting means at the times of arrival of said pair of indicia, respectively, for providing said second and third discrete signals, respectively.

4. Apparatus according to claim 3, wherein said storage means comprises:
a plurality of latches coupled in parallel to said counting means.

5. Apparatus according to claim 1, wherein said interval means includes:
transducer means positioned at said transporter for producing successive advancement signals in response to said surface moving relative to said apparatus by predetermined increments;
a counter for counting said successive advancement signals; and
comparison means for providing first and second control signals upon said counter reaching predetermined first and second counts, respectively, timed to occur prior to the arrival of corresponding ones of said pair of indicia, respectively.

6. Apparatus according to claim 5, wherein said comparison means comprises:
first and second comparators for producing said first and second control signals, respectively, upon said counter reaching said first and second counts, respectively; and
a third comparator for producing a third control signal upon said counter reaching a third count.

7. Apparatus according to claim 5, wherein said interval means further includes:
logic means connected to said comparison means, said logic means being responsive to said first and second control signals for enabling said sensor means shortly before and during the different arrival times at said sensor means of said pair of indicia, respectively, said sensor means being disabled in the absence of one of said first and second control signals, whereby said indicia are detectable within zones, making said indicia more readily distinguishable from extranious marks on said surface.

8. Apparatus according to claim 1, wherein said interval means comprises:
means, having a disk, for rotating said disk at a speed proportional to the relative speed of said surface at said transporter, said disk having an indexed periphery; and
a transducer coupled to said disk for producing said successive interval signals as a function of the indexing of said disk.

9. Apparatus according to claim 8, wherein said sensor means comprises:
a phototransistor responsive to passage of one of said pair of indicia.

10. Apparatus according to claim 8, wherein said sensor means comprises:
a pair of phototransistors each responsive to a different corresponding one of said pair of indicia.

11. Apparatus according to claim 8 wherein said disk has a plurality of equally spaced apertures, said interval means comprising:
doubling means for producing a pulse upon the arrival and the departure thereat of each of said apertures, whereby the number of said advancement signals is doubled.

12. Apparatus according to claim 1 further comprising:
manually adjustable means for rescaling the ratio D to represent the actual distance in given units between said pair of indicia 13. Apparatus according to claim 1 further comprising:
control means connected to said timer means to receive a signal signifying the ratio D, for producing an error signal signifying the difference between a predetermined standard and said ratio D;
print means for repetitively printing a pattern on said surface; and
actuation means coupled to said control means for either advancing or retarding said surface at said print means in response to said error signal.

14. Apparatus according to claim 13, wherein said print means includes a rotatable downstream printing cylinder and wherein said apparatus further includes;
a rotatable upstream printing cylinder for repetitively printing a pattern on said surface, said interval means being coupled to said surface via said upstream cylinder to produce one of said interval signals once for each revolution of said upstream printing cylinder.

15. In a system responsive to indicia positioned in pairs within each of a plurality of successive repeating intervals of predetermined distance on a surface moving relative to said system, means for sensing the spacing D between the indicia of each of the pairs, comprising:
interval means positioned alongside said surface for producing in response to motivation thereof repeating interval signals signifying the time GR elapsing during the passage of each of the repeating interval signals, said surface being transported by said transporter at a relatively constant velocity during passage of said predetermined distance;
sensor means positioned alongside said surface for providing, in response to the successive arrival times of each of the indicia of each of said pairs at said sensor means, indicia signals designated W1 for the arrival time of the first indicia of said pair of indicia to arrive, and W2 for the arrival time of the second indicia of said pair of indicia; and
ratio means, coupled to said interval means and said sensor means to receive said inteval signals and said indicia signals, and for calculating successive ratios of the time difference in arrival of the indicia of each of said pairs of indicia to its corresponding one of said repeating interval signals, each ratio D equalling (W2−W1)/GR, with D being the respective indicia spacing in normalized units, said scale means including a clock means for establishing the times for the time intervals (W2−W1) and GR.

16. In a system according to claim 15, wherein said scale means includes:
control means for producing an error signal signifying the difference between an initial one and a current one of said repeating distance signals.

17. In a system according to claim 16 further comprising:
rotatable upstream and downstream printing cylinders each for repetitively printing a pattern on said surface, said interval means being coupled to said upstream cylinder to produce said interval signal once for each revolution of said upstream cylinder; and
actuation means coupled to said control means for either advancing or retarding said surface at said downstream cylinder in response to said error signal.

18. A method employing a clock and being responsive to indicia positioned in pairs within each of a plurality of successive repeating intervals of predetermined distance on a surface moving relative to said system, said method being performed to sense the spacing D between the indicia of each of the pairs, comprising the steps of:
transporting said surface with respect to said system at a relatively constant velocity during passage of said predetermined distance;
marking elapsed time with said clock in response to motivation of said surface, to obtain repeating interval quantities signifying the time GR elapsing during the passage of each of the successive repeating intervals;
recording arrivals with said clock in response to the successive arrival times of each of the indicia of each of said pairs to obtain indicia quantities designated W1 for the arrival time of the first indicia of said pair of indicia to arrive, and W2 for the arrival time of the second indicia of said pair of indicia; and
calculating from said interval quantities and said indicia quantities, successive ratios of (a) the time difference in arrival of said indicia of each of said pairs of indicia to (b) its corresponding one of said repeating interval quantities, each ratio D equalling (W2−W1)/GR, with D being the respective indicia spacing in normalized units.

19. A method according to claim 18, wherein said surface is a web moving between two printers, further comprising the step of:
either advancing or retarding the web in one of said printers depending upon the variation of said ratio from a predetermined standard.

* * * * *